(12) United States Patent
D'souza

(10) Patent No.: US 12,088,715 B2
(45) Date of Patent: Sep. 10, 2024

(54) SYSTEM AND METHOD TO ENABLE A SECURE COMMUNICATION

(71) Applicant: Richard D'souza, Langley (CA)

(72) Inventor: Richard D'souza, Langley (CA)

( * ) Notice: Subject to any disclaimer, the term of this patent is extended or adjusted under 35 U.S.C. 154(b) by 255 days.

(21) Appl. No.: 17/903,016

(22) Filed: Sep. 5, 2022

(65) Prior Publication Data

US 2023/0074843 A1    Mar. 9, 2023

Related U.S. Application Data

(60) Provisional application No. 63/249,969, filed on Sep. 29, 2021.

(51) Int. Cl.
*H04L 9/30* (2006.01)
*H04L 9/08* (2006.01)

(52) U.S. Cl.
CPC .......... *H04L 9/3066* (2013.01); *H04L 9/0861* (2013.01)

(58) Field of Classification Search
CPC .............................. H04L 9/3066; H04L 9/0861
See application file for complete search history.

(56) References Cited

U.S. PATENT DOCUMENTS

| | | | | |
|---|---|---|---|---|
| 9,225,695 | B1* | 12/2015 | Riera | H04L 63/101 |
| 9,921,976 | B2* | 3/2018 | Linga | H04W 12/08 |
| 10,430,789 | B1* | 10/2019 | Herald, Jr. | G06Q 20/40 |
| 2011/0138192 | A1* | 6/2011 | Kocher | H04L 9/003 |
| | | | | 713/189 |
| 2012/0151553 | A1* | 6/2012 | Burgess | G06F 21/6218 |
| | | | | 726/1 |
| 2012/0167164 | A1* | 6/2012 | Burgess | G06F 21/552 |
| | | | | 726/28 |
| 2013/0133026 | A1* | 5/2013 | Burgess | H04L 12/6418 |
| | | | | 726/28 |
| 2014/0006802 | A1* | 1/2014 | Cachin | G06F 21/602 |
| | | | | 713/189 |
| 2018/0240691 | A1* | 8/2018 | Flitsch | H01L 21/0274 |

(Continued)

OTHER PUBLICATIONS

NPL Search History (Year: 2024).*

*Primary Examiner* — Samson B Lemma
*Assistant Examiner* — Richard W Cruz-Franqui
(74) *Attorney, Agent, or Firm* — RC Trademark Company

(57) ABSTRACT

The proposed system employs an architectural arrangement of a plurality of relevant functional element to enable a secure communication. An artificial intelligence (AI) server is communicably coupled with a first local network server, a second local network server, a first computing device and a second computing device over a communication network interface. The AI server, first local network server, the second local network server is arranged to perform one or more security orchestration before transmission of the received encrypted data packet. The first computing device is arranged to receive the transmitted encryption key and the first self-destruction code, from the AI server, associated with the first communication request. Similarly, the second computing device receive the communicated acquired TEDP, the decryption key and the second self-destruction code, perform decryption, execution of the second self-destruction code to destroy the decryption key and triggers an execution command to execute the first self-destruction code to destroy the encryption key.

22 Claims, 3 Drawing Sheets

(56) References Cited

U.S. PATENT DOCUMENTS

| | | | |
|---|---|---|---|
| 2019/0026499 A1* | 1/2019 | Flitsch | G06F 21/606 |
| 2020/0334372 A1* | 10/2020 | Kim | H04L 63/102 |
| 2021/0319142 A1* | 10/2021 | Kärkkäinen | H04L 9/0891 |
| 2023/0074843 A1* | 3/2023 | D'souza | H04L 9/0861 |

* cited by examiner

SYSTEM AND METHOD TO ENABLE A SECURE COMMUNICATION

FIELD OF THE INVENTION

The present invention relates to a system enabling a secure communication between one or more computing devices. More specifically, the present invention relates to a secure communication whereby one or more relevant functional configuration/apparatus may be systemically and systematically arranged to perform encryption/decryption of shared and stored data, for maintenance of a sanctity and integrity thereof.

BACKGROUND

The background description includes information that may be useful in understanding the present invention. It is not an admission that any of the information provided herein is prior art or relevant to the presently claimed invention, or that any publication specifically or implicitly referenced is prior art.

Cyber security solutions vulnerabilities pertaining to static authentication factors, such as passwords, PINs and biometrics, are entered directly into the portal or stored on computers that can be accessed in the network domain. This weakness makes static authentication factors vulnerable to phishing attacks in the host domain or security breaches in the network domain. Furthermore, some biometric factors are immutable, and if an immutable biometric factor is compromised, then the reuse of the compromised biometric factor reduces the security of the system.

Public/private key cryptography is in widespread use throughout the Internet and the World Wide Web and is relied on to prevent hackers, thieves, or other malicious individuals, parties, or governments from intercepting and decrypting personal, private, or otherwise sensitive information. Increasingly, however, these malicious parties are able to overcome and/or circumvent standard public/private key cryptography.

In addition, hackers have become adept at undermining, circumventing, or weakening standard public/private key cryptography such that a brute-force attack is not required or necessary. For example, malware surreptitiously installed on a client computer may log a user's keystrokes and a script injection attack can acquire credentials as a user is typing them in or modify the script completely so https or any other secure protocol is completely disabled, and thereafter credentials are transmitted to third party.

Similarly, a phishing attempt (via a web page, email, or malware application) may acquire the user's log-in name and password directly. Existing public/private key cryptography utilizes a trusted signing authority; a malicious third party may corrupt and/or stand in the place of this trusted signer and thereby weaken the strength of or eliminate the user's encryption, even if the user is presented with a warning that the signing authority is not recognized, the user may click through anyway. Finally, the public/private key encryption algorithms themselves may be attacked and weakened by a third party, the government or even the designer, for example, coercing a business or service to use weaker encryption algorithms and/or to generate weak random numbers (i.e., numbers that purport to be random but exhibit some pattern or history known to the malicious third party), and the best performing, most popular encryption algorithms today, Blowfish and AES, have a built-in key size limitation weakness, degrading their ability to stand the test of time and eventually rendering them useless as computing power continues to improve.

For any or all of these reasons, a need therefore exists for a system and method for robust and secure communication that is unbreakable by attacks on computer network, detecting the presence of malware or an unauthorized participant to the transmissions, transmitting sensitive information in a hack-proof format there between.

Henceforth, one or more functional elements are systemically and systematically dedicated and intended to preserve confidentiality, integrity, and availability of data under the protection of proposed disclosure.

SUMMARY

The present invention relates to a system enabling a secure communication between one or more computing devices. More specifically, the present invention relates to a secure communication channel whereby one or more relevant functional configuration/apparatus may be systemically and systematically arranged to perform encryption/decryption of shared and stored data, for maintenance of a sanctity and integrity thereof.

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

The following paragraphs provide additional support for the claims of the subject application.

In an aspect the present disclosure provides a system to enable a secure communication between a first computing device and a second computing device, the system comprises: an artificial intelligence (AI) server is communicably coupled with a first local network server and a second local network server, wherein the AI server is configured to: receive a data communication request, from the first computing device; generate an encryption key and a decryption key, by utilizing an Elliptic Curve Cryptography (ECC) mechanism, in response to the received data communication request, wherein the encryption key is associated with a first self-destruction code and the decryption key is associated with a second self-destruction code; and transmit the generated encryption key and the first self-destruction code to the first computing device, through the first local network server, and the generated decryption key and the second self-destruction code to the second computing device, through the second local network server; the first computing device is arranged to receive the transmitted encryption key and the first self-destruction code, from the AI server, through the first computing device, and perform encryption of a data packet by using the received encryption key, to generate an encrypted data packet; the first local network server is arranged to receive the encrypted data packet and perform a first security orchestration before transmission of the received encrypted data packet to the AI server; the AI server is arranged to acquire the transmitted encrypted data packet (TEDP) from the first local network server and perform a second security orchestration before dispatching of the acquired TEDP to the second local network server; the second local network server is arranged to receive the acquired TEDP from the AI server and perform a third security orchestration before communicating the acquired TEDP to the second computing device; the second computing device is arranged to: receive the communicated acquired TEDP the decryption key and the second self-destruction code from the second local network server; perform decryption of the received communicated acquired TEDP, using the received decryption key, to generate a decrypted data packet; utilize an execution unit executes the second self-destruction code to destroy the decryption key; and utilize a trigger unit triggers an execution command to execute the first self-destruction code to destroy the encryption key.

In another aspect the present disclosure provides a method for enabling a secure communication between a first computing device and a second computing device, the method comprises: receiving, at an artificial intelligence (AI) server, a data communication request, from the first computing device through a first local network server; utilizing, an Elliptic Curve Cryptography (ECC) mechanism at the AI server, to generate an encryption key and a decryption key, wherein the encryption key is associated with a first self-destruction code; and wherein the decryption key is associated with a second self-destruction code; transmitting: the encryption key and the first self-destruction code to the first computing device, through the first local network server and the decryption key and the second self-destruction code to the second computing device, through a second local network server; encrypting, at the first computing device, a data packet by using the received encryption key, to generate an encrypted data packet; receiving, at the first local network server, the encrypted data packet to perform a first security orchestration before transmission of the received encrypted data packet to the AI server; acquiring, at the AI server from the first local network server, the transmitted encrypted data packet (TEDP) and performing a second security orchestration before dispatching of the acquired TEDP to the second local network server; receiving, at the second local network server, from the AI server, the acquired TEDP to perform a third security orchestration before communicating the acquired TEDP to the second computing device; receiving, at the second computing device from the second local network server, the communicated acquired TEDP, the decryption key and the second self-destruction code; performing, at the second computing device, decryption of the received communicated acquired TEDP, using the received decryption key, to generate a decrypted data packet; and executing, the first self-destruction code and the second self-destruction code to destroy the encryption key and the decryption key.

In an embodiment, the first self-destruction code is associated with a first set of condition to execute the first self-destruction code to destroy the encryption key.

In an embodiment, the first set of condition is selected from a first nature of encryption algorithm used for encryption of the data packet, a first Internet Protocol (IP) address of the first computing device, a first Media Access Control (MAC) address of the first computing device, a first nature of the data packet, a first content of data packet, a first safe geological location of the first computing device, and an authenticity of the sender.

In an embodiment, first security orchestration, the second security orchestration and the third security orchestration comprising analysis of at least one parameter selected from: a traffic rate, a suspicious activity, a domain name server (DNS) details, a non-compatible data, and a type of attachment.

In an embodiment, the first computing device is configured to transmit an alert to the AI server, upon destruction of the encryption key.

In an embodiment, the second computing device is configured to transmit an alert to the AI server, upon destruction of the decryption key.

In an embodiment, the AI server generates a new encryption key, upon confirmation of destruction of the encryption key.

In an embodiment, the AI server generates a new decryption key, upon confirmation of destruction the decryption key.

In an embodiment, the first computing device is configured to authenticate the sender using at least one biometric parameter, before transmission of the data communication request to the AI server, through the first local network server.

In an embodiment, the second computing device is configured to authenticate a recipient using at least one biometric parameter, before acquisition of data communication request to the AI server, through the first local network server.

In an embodiment, the second self-destruction code is associated with a second set of condition to execute the first self-destruction code to destroy the encryption key.

In an embodiment, the second set of condition is selected from a second nature of decryption algorithm used for decryption of the received communicated acquired TEDP, a second Internet Protocol (IP) address of the second computing device, a second Media Access Control (MAC) address of the second computing device, a second nature of the acquired TEDP, a second content of the acquired TEDP, a second safe geological location of the second computing device, and an authenticity of a recipient.

BRIEF DESCRIPTION OF THE DRAWINGS

The features and advantages of the present disclosure would be more clearly understood from the following description taken in conjunction with the accompanying drawings in which.

DETAILED DESCRIPTION

Figure 1:
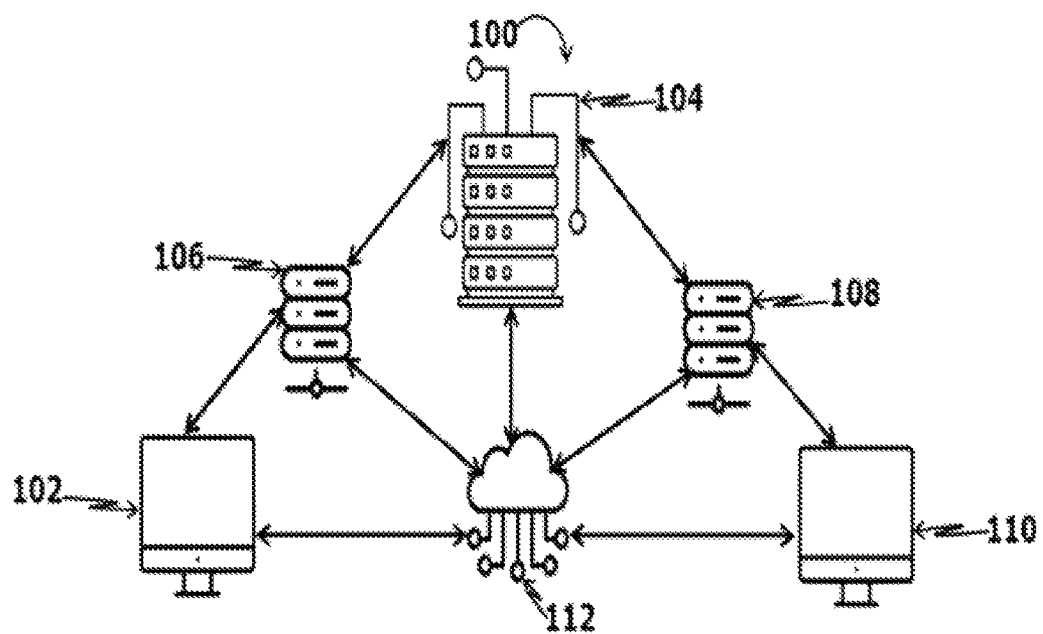
FIG. 1 illustrates an architectural paradigm of a system to enable a secure communication between a first computing device and a second computing device, in accordance with the embodiments of present disclosure.

In the following detailed description of the invention, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to claim those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The present invention relates to a system enabling a secure communication between one or more computing devices. More specifically, the present invention relates to a secure communication channel whereby one or more relevant functional configuration/apparatus may be systemically and systematically arranged to perform encryption/decryption of shared and stored data, for maintenance of a sanctity and integrity thereof.

According to an illustration made in FIG. 1, showcasing an architectural paradigm of a system 100 to enable a secure communication between a first computing device 102 and a second computing device 110. The term "secure communication" as used herein may relate to, but not limited to a protected, a verified, an authenticated, a validated, a legitimate architectural setup of communication (such as a communication channel/portal/passage and the like) deployed to maintain confidentiality/sanctity and integrity of a communicated data (such as transmitted or received) between the first computing device 102 and second computing device 110. For instance, the system 100 may be enabled to perform encryption and decryption of a communicated data (such as a transmitted data or received data, respectively), in accordance with the embodiments of present disclosure. The system 100 may prevent or deter an illegitimate use (such as, but not limited to illegally reproducing or disseminating the communicated confidential information/data) of transmitted and received data and hence can suit one or more objective or purpose of deployment thereof. The first computing device 102 and second computing device 110 can also securely establish communication with other authorized devices and securely transmit/reception of data/information/files, among 102, 110 and the devices. Such transmission/reception can be performed through an internal block chain and a secure end-to-end communication channel.

Throughout the present disclosure, the term "computing device" and/or "electronic device" can relate to a device, including but not limited to, a cellular phone, a smart phone, a personal digital assistant (PDA), a handheld device, a wireless modem, a laptop, a mobile terminal, a user terminal, a subscriber unit, and other known variants thereof. The first computing device 102 and second computing device 110 may include a casing, a network interface card, a display, and the like. The first computing device 102 and second computing device 110 may be associated with a first user (such as a sender) and a second user (such as a receiver), respectively.

The first computing device 102 and the second computing device 110 may exemplarily comprise a storage media may include volatile and non-volatile, removable and non-removable media implemented in any method or technology for storage of information, such as computer readable instructions, data structures, program modules, and the like. Non limiting examples of computer storage media can include RAM, ROM, EEPROM, flash memory, or other optical storage, magnetic disc storage or other magnetic storage devices, or other known compatible storage medium which can be used to store a desired information (such as one or more genetic information and relevant data thereof) and which can be accessed by an application, module, or both.

In an embodiment, the architectural paradigm of a system 100 may comprise an artificial intelligence (AI) server 104, a first local network server 106, a second local network server 108, a communication network interface 112 and other known elements thereof. A person ordinarily skilled in art would prefer that one or more elements of the system 100 may be communicably or functionally coupled or interlinked with each other, over the communication network interface 112, in accordance with the embodiments of present disclosure. Throughout the present disclosure, a communicated data or transmitted data can be interchangeably used. The AI server 104, first local network server 106 and the second local network server 108 can reside in a local area network or in a cloud computing platform.

In an embodiment, the artificial intelligence (AI) server 104 may be communicably coupled with the first local network server 106 and the second local network server 108, over the communication network interface 112. The AI server 104 may be arranged to perform one or more functional operations which can be associated with the objective of deploying system 100. For instance, an exemplary control unit may be configured with the AI server 104 to perform a receiving/reception of one or more data communication request, a generation of an encryption key and a decryption key, a transmission of the generated encryption key and the first self-destruction code and other known exemplary functional operations.

Referring to an epitome of preceding embodiment, the control unit may be enabled with a bus which may include a path that can permit a communication among one or more functional embodiments of the control unit. For instance, one or more processor or microprocessor or microcontroller, a memory or storage device deployed thereof. The control unit may be enabled with a processing module or engine which may include one or more processor (such as a central processing unit, a graphics processing unit, an accelerated processing unit and the like), one or more microprocessor, and/or another type of processing component (such as a field-programmable gate array ("FPGA"), an application-specific integrated circuit ("ASIC"), and the like) that can interpret and/or execute instructions. The memory may include a random-access memory ("RAM"), a read only memory ("ROM"), and/or another type of dynamic or static storage device (e.g., a flash, magnetic, or optical memory) that may store information and/or instructions for an execution by the processor.

Figure 2:
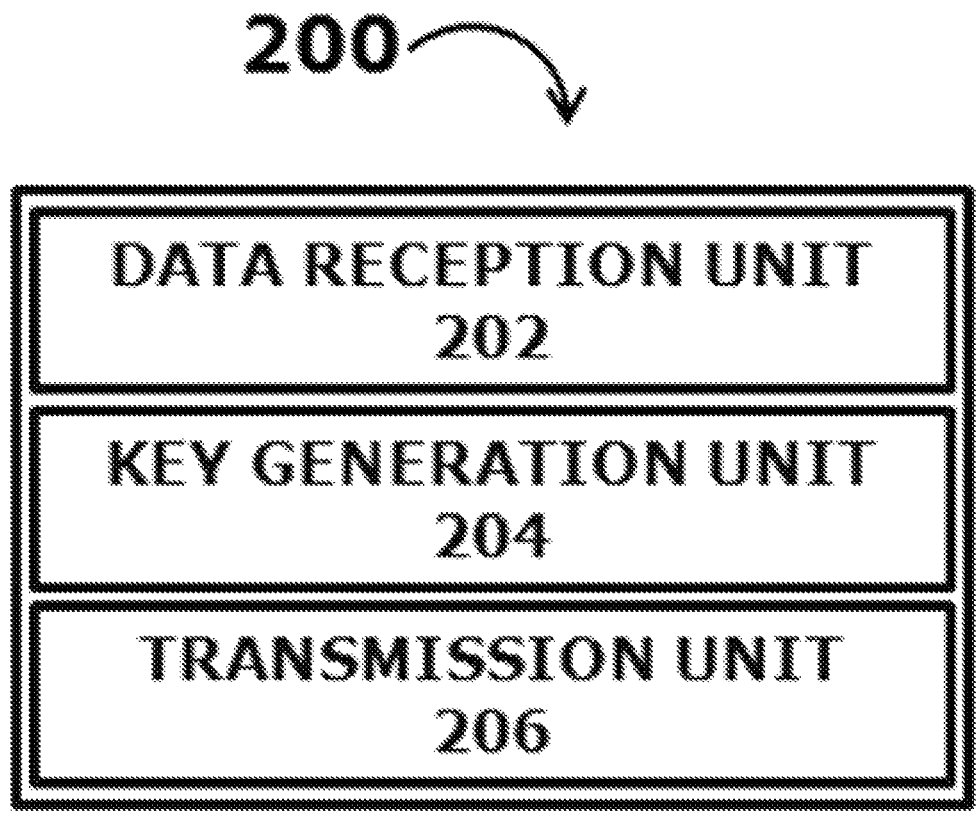
FIG. 2 illustrates an architectural arrangement of one or more functional unit, which can be executed collectively or selectively by one or more processors of the exemplary control unit associated or arranged with AI server, in accordance with the embodiments of present disclosure.

According to an illustration made in FIG. 2, may portray an architectural arrangement 200 of one or more functional units, which can be executed collectively or selectively by one or more processors of the exemplary control unit associated or arranged with AI server 104, in accordance with the embodiments of present disclosure. The architecture 200 may comprise a data reception unit 202, a key generation unit 204, a transmission unit 206, and other known elements thereof. One or more executable routines may be stored in the memory/storage media wherein each of the executable routine, may include one or more functional unit as mentioned herein.

In an embodiment, the data reception unit 202 may be arranged to receive one or more data communication request, from the first computing device 102, may be over the communication network interface 112. To those ordinarily skilled in art may prefer that one or more received information may be stored for any duration in the exemplary storage media/memory associated with the AI server 104 and may be accessed, modified and updated.

Referring to the preceding embodiment, the data communication request may indicate an intended use of the system 100. The data communication request may enable the AI server 104 to enforce one or more usage policies based on the intended use. For example, the data communication request may include one or more data/information to be transferred/transmitted from the first computing device 102 to the communication network interface 112 using the architecture of system 100. Alternatively or additionally, the data communication request may indicate a specified service running on the first computing device 102 to be shared with the second computing device 110 via employing the architecture of system 100.

In an alternate embodiment, the data communication request may comprise an identifier (such as an authentication credential), wherein sending of communication data may be associated with the identifier. For instance, an identity of the first computing device 102 such as IP address that can be authenticated by the AI server 104. For example, a first identifier may correspond to a user identity associated with the first computing device 102. Alternatively, the first identifier may correspond to a predetermined information such as a PIN or a password or a biometric credentials, or a picture password and other known critical information pre-stored on the first computing device 102.

Referring to the preceding embodiment, the biometric unit may comprise one or more biometric parameter acquisition means such as, but not restricted to a microphone (may be arranged to receive an audio sample of user) a fingerprint scanner (may be arranged to receive a fingerprint of user), a camera (may be arranged to receive a facial feature of the user) and other known variants thereof. However, the biometric unit may exemplary be modified or ameliorated or enhanced or consolidated to configure or integrate a plurality of biometric sensors may be selected from an IRIS recognition sensor, a fingerprint sensor, a temperature sensor, a weight sensor and other known exemplifications thereof.

In an embodiment, an execution of the key generation unit 204 may generate an encryption key and a decryption key, by utilizing an Elliptic Curve Cryptography (ECC) mechanism, in response to the received data communication request. For instance, the key generation unit 204 may implement ECC mechanism which may be based on one or more algebraic structures of the elliptic curves.

Referring to the preceding embodiment, the term "Elliptic Curve Cryptography (ECC)" may relate to utilization of the mathematics of elliptic curves, for generation of security, between key pairs for public key encryption. The ECC is an approach to utilize multiple algorithms for key generation, encryption and decryption and perform cryptography.

Elliptic curves are more appropriate for specific tasks, including but not limited to, key agreement, digital signatures, pseudo-random generators. ECC perform encryption by combining the key agreement with a symmetric encryption mechanism. For an instance, the implementation of ECC may transform a plaintext (a non-encrypted or unprotected data) into a cipher text (an encrypted or protected data), wherein the transformation may be referred to as encryption of the communicated data.

Referring to the preceding embodiment, the encryption key may be associated with a first self-destruction code and the decryption key may be associated with a second self-destruction code (may include numerals, integers, special characters or a combination thereof). The term "self-destruction" as used herein may relate to, but not limited to an approach or technique implemented for a protection or privacy of a transmitted or communicated data, by destructing autonomously. For instance, an execution of the self-destruction code may enable a destruction of the communicated data, a cache or one or more copies thereof, and the decryption key after a predefined or user specified time (such as may be after 30 minutes of reception of transmitted or communicated data).

Referring to the preceding embodiment, the first self-destruction code can be associated with a first set of condition to execute the first self-destruction code to destroy the encryption key. In an event, when encryption key needs to be destroyed, first set of condition is primarily analysed. As per analysed condition, the first self-destruction code can be destroyed. The first set of condition can be selected from a first nature of encryption algorithm used for encryption of the data packet, a first Internet Protocol (IP) address of the first computing device, a first Media Access Control (MAC) address of the first computing device, a first nature of the data packet, a first content of data packet, a first safe geological location of the first computing device and an authenticity of the sender (such as the user associated with the first computing device 102.

In an embodiment, the second self-destruction code can be associated with a second set of condition to execute the second self-destruction code which may enable the destruction of the decryption key. The AI server can generate a fresh/new decryption key, upon confirmation of destruction of the decryption key. The second set of condition may be selected from a second nature of decryption algorithm used for decryption of the received communicated acquired TEDP, a second Internet Protocol (IP) address of the second computing device, a second Media Access Control (MAC) address of the second computing device, a second nature of the acquired TEDP, a second content of the acquired TEDP, a second safe geological location of the second computing device 110, and an authenticity of a recipient (such as the user associated with the second computing device 110.

In an embodiment, an execution of the transmission unit 206 may transmit the generated encryption key and the first self-destruction code to the first computing device 102, through the first local network server 106, and the generated decryption key and the second self-destruction code to the second computing device 110, through the second local network server 108. For instance, the first computing device 102 may be configured to authenticate the sender using at least one biometric parameter, before transmission of the data communication request to the AI server 104, through the first local network server 106. One or more transmitted information (such as generated encryption key, the first self-destruction code and the like) may be alerted/received in form a notification (such as an acoustic or light signal or a combination thereof) on the first computing device 102. Further, the user may be authenticated (such as enter a PIN or a password) prior to an access to one or more information alerted by the notification, can deter a misuse.

Similarly, the second computing device 110 may be configured to authenticate a recipient using at least one biometric parameter, before an acquisition of data communication request from the AI server 104, through the first local network server 106. The execution of transmission unit 206 may enable an exemplarily configured data transceiver with the AI server 104 to transmit generated encryption key and the first self-destruction code to the first computing device 102, through the first local network server 106, and the generated decryption key and the second self-destruction code to the second computing device 110, second local network server 108, interlinked over communication network interface 112.

Referring to one or more embodiments of the present disclosure, the first local network server 106 and the second local network server 108, may be arranged locally or closely to the first computing device 102 and the second computing device 110, respectively while the AI server 104 may be located remotely. The AI server 104 may be arranged to operationally function as a central or a mainframe or a control or a web or an administrator server while the first local network server 106 and the second local network server 108 may function as a sub server or a client server and other known examples thereof.

In an embodiment, the first computing device 102 may be arranged to receive the transmitted encryption key and the first self-destruction code, from the AI server 104, and perform encryption of a data packet by using the received encryption key, to generate an encrypted data packet. For instance, encryption of data packets may be considered as one of steps to enable secure communication. The term "encryption" as used herein may relate to but not limited to electronically scramble one or more data packets and lock them with the encryption key prior to transmission over communication network interface 112. In an alternate embodiment, one or more security protocols such as a Wired Equivalent Privacy (WEP), or a Wi-Fi Protected Access (WPA), or WPA2 encryption may implement encryption algorithm to scramble data packets and can secure the communicated data from a potent breach or violation thereof.

In an embodiment, the first local network server 106 may be arranged to receive the encrypted data packet and perform a first security orchestration prior to a transmission of the received encrypted data packet to the AI server 104. The term "security orchestration" as used herein may relate to, but not limited to an integration or systematic alignment of one or more cyber security processes and tools which may streamline a range of security operations tasks. Security orchestration is the process of integrating a disparate ecosystem of SOC tools and processes to automate tasks for simpler, more effective security operations. There are plethora of cybersecurity security tools and processes which are utilized to prevent, detect and mitigate security threats. Integration of these disparate tools and processes into a unified ecosystem amplifies efficiency and reduce threats. Security orchestration enables harmony among these processes. For instance, security orchestration may include a determination and management of one or more cyber threat (such as app-based threats (malicious apps), web-based threats (phishing), network threats (free Wi-Fi), physical threats (no PIN or biometric authentication)) or alerts thereof, contextualize and centralize incident response data (such as, not limited to a transformation of rows of textual data into meaningful, context-rich detail), collaboration, automation and other known examples thereof. Throughout the present disclosure "first security orchestration", "second security orchestration" and "third security orchestration" may perform any aforementioned task.

In an embodiment, the AI server 104 may be arranged to acquire the transmitted encrypted data packet (TEDP) from the first local network server 106 and perform a second security orchestration, can be prior to a dispatch of the acquired TEDP to the second local network server 108. One or more security orchestration such as first, second, third and so forth security orchestration may be regarded or considered by those ordinarily skilled in art as one or more security layers or tiers that the communicated data may go or pass through to enable or reinforce or consolidate a secure transmission or communication thereof, between the first computing device 102 and the second computing device 110.

In an embodiment, the second local network server 108 may be arranged to receive the acquired TEDP from the AI server 104 and perform a third security orchestration prior to a transmission of the acquired TEDP to the second computing device 110. One or more systematic and systemic inclusion and execution of security orchestration may achieve one or more objective and purpose of the system 100, in accordance with the embodiments of present disclosure. For instance, the first security orchestration, the second security orchestration and the third security orchestration may comprise or incorporate an analysis of at least one parameter selected from a traffic rate, a suspicious activity, a domain name server (DNS) details, a non-compatible data, and a type of attachment. According to the analysis, an information log can be maintained to perform detailed analysis of various parameters. One or more policies or processes can be implemented according to type of parameter.

Figure 3:
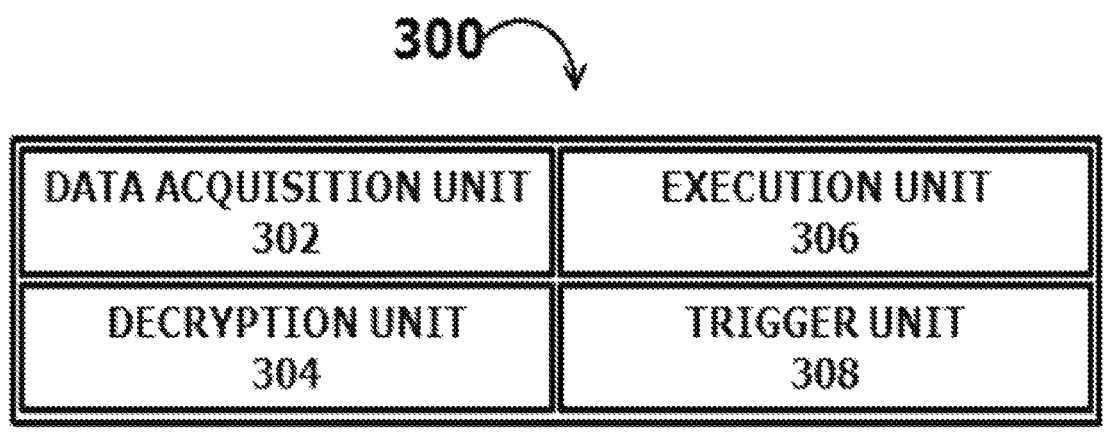
FIG. 3 represents an architectural arrangement of one or more functional units, which can be executed collectively or selectively by one or more processors associated with the second computing device 110, in accordance with the embodiments of present disclosure.

According to an illustration made in FIG. 3, may portray an architectural arrangement 300 of one or more functional unit, which can be executed collectively or selectively by one or more processors associated with the second computing device 110, in accordance with the embodiments of present disclosure. The architecture 300 may comprise a data acquisition unit 302, a decryption unit 304, an execution unit 306, a trigger unit 308 and other known elements thereof. One or more executable routines may be stored in the memory/storage media wherein each of the executable routine, may include one or more functional unit as mentioned herein.

In an embodiment, the data acquisition unit 302 may be arranged to receive the communicated/transmitted/acquired TEDP, the decryption key and the second self-destruction code from the second local network server 108, over the communication interface, in accordance with the embodiments of present disclosure. A person ordinarily skilled in art may prefer that one or more received information may be systematically arranged in an information database and exemplary stored in the memory/storage media, for any duration, can thus enable an accession thereof, as and when necessary.

In an embodiment, the decryption unit 304 may be executed by one or more processors of the second computing device 110 to perform a decryption of the received communicated acquired TEDP, using the received decryption key, to generate a decrypted data packet. For instance, the decryption key may be employed to unscramble or restore or decrypt the encrypted data packet and acquire the decrypted data packet (such as a conversion of a cipher text to a plain text and the like). Throughout the present disclosure, the embodiments of the present disclosure are not limited to any specific "encryption" algorithm or "decryption" algorithm. Any suitable encryption algorithm or decryption algorithm can form part of present disclosure.

In an embodiment, the execution unit 306 may execute the second self-destruction code to destroy the decryption key. For instance, the execution unit 306 may perform the execution of the second self-destruction code to destroy the decryption key after a lapse of preset or user defined time (such as 3 minutes, 5 minutes, 7 minutes and the like) post decryption. The execution unit 306 may autonomously or automatically cause an execution of the self-destruction code after a lapse of preset time, may or may not notify either the first computing device 102 or the second computing device 110 about the execution. However, a person ordinarily skilled art may prefer a notification/alert on either or both computing devices (such as first computing device 102 and second computing device 110 or AI server 104 about a successful execution of self destruction code which may enable or trigger a scheduled destruction or auto expiry of the decryption key.

In an embodiment, the trigger unit 308 may trigger an execution command to execute the first self-destruction code to destroy the encryption key. For instance, the trigger unit 308 may implement an attribute-based encryption (ABE) or a distributed hash table (DHT) or a secure cipher text self-destruction (SCSD) scheme/technique/approach to process or execute the first self-destruction code to destroy the encryption key.

In an embodiment, the first computing device 102 may be configured to transmit an alert to the AI server 104, upon destruction of the encryption key. Similarly, the second computing device 110 can be configured to transmit an alert to the AI server 104, upon destruction of the decryption key. The AI server 104 can generate a new encryption key, upon a confirmation of destruction of the encryption key.

In an exemplary embodiment, the communication network interface 112 can be arranged to functionally or operationally interlink the elements of the system 100, with each other. Non-limiting examples of communication network interface 112 may include a short-range communication network interface 112 and/or long-range communication network interface 112. The short-range communication network interface 112 may include Wi-Fi, Bluetooth low energy (BLE), Zigbee, and the like. The long-range communication network interface 112 may include Local Area Network (LAN), Metropolitan Area Network (MAN), Wide Area Network (WAN), a cloud computing platform, a data center, Internet of Things (IoT), light fidelity (LiFi) and the like. The embodiments of proposed disclosure, may work well with any or a combination of aforementioned networks.

The communication network interface 112 may include any or a combination of wired or wireless communication mechanisms that can be performed through various computer networking protocols. The computer networking protocol may include Asynchronous Transfer Mode (ATM), Transmission Control Protocol/Internet Protocol (TCP/IP), Ethernet management, Simple Mail Transfer Protocol (SMTP); and security, such as Secure Shell (SSH), Hypertext Transfer Protocol (HTTP), File Transfer Protocol (FTP) and User Datagram Protocol (UDP). Moreover, any other suitable protocols using voice, video, data, or combinations thereof, can also be employed.

Embodiments of the present invention and the operations described herein can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium cannot be a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Figure 4:
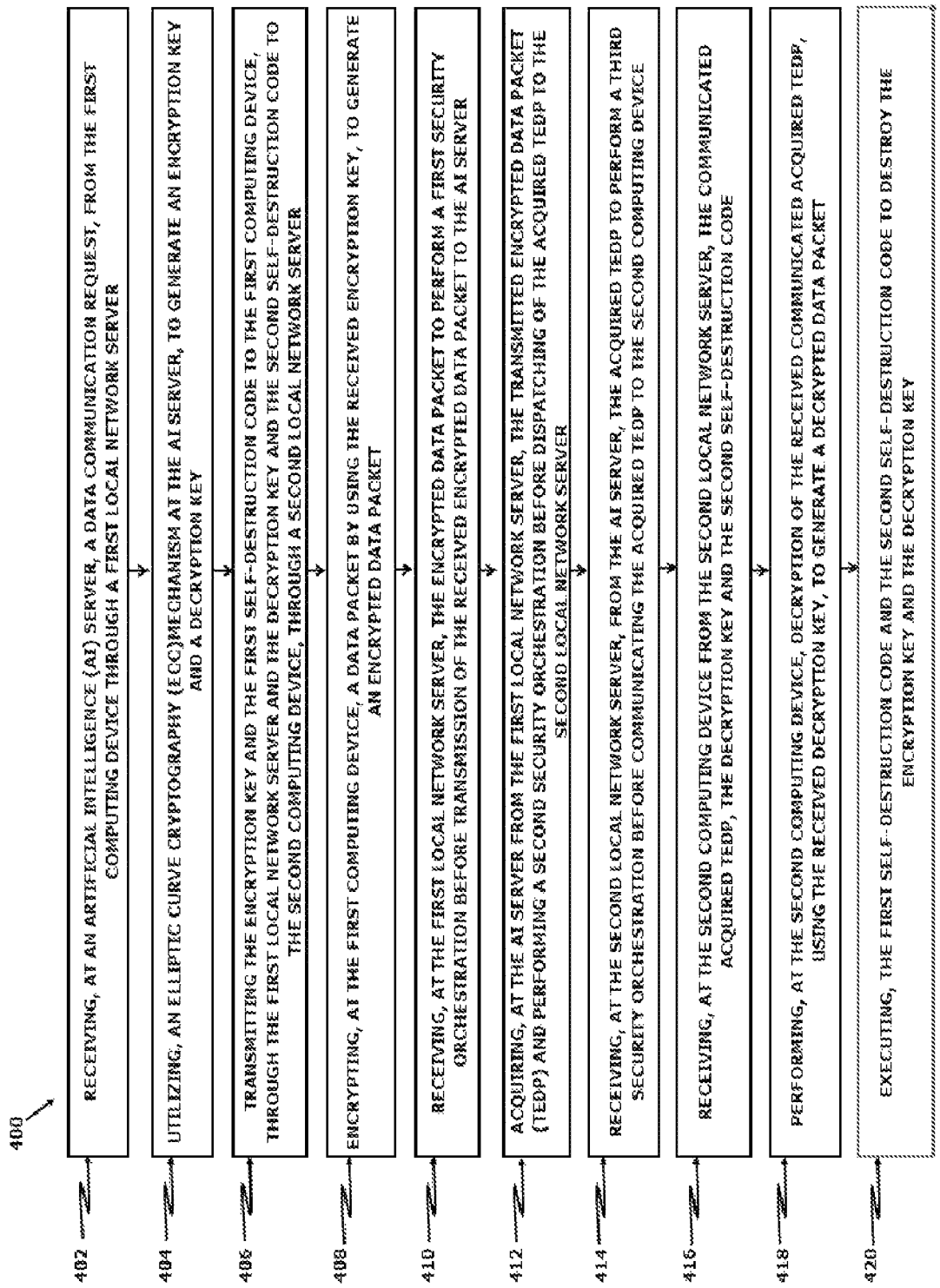
FIG. 4 illustrate exemplarily steps for enabling a secure communication between a first computing device and a second computing device, in accordance with embodiments of the present disclosure.

FIG. 4 illustrate exemplarily steps for enabling a secure communication between a first computing device and a second computing device, in accordance with embodiments of the present disclosure. As illustrated in flow diagram 400, the method may include steps of: at step (402), receiving, at an artificial intelligence (AI) server, a data communication request, from the first computing device through a first local network server; step (404), utilizing, an Elliptic Curve Cryptography (ECC) mechanism at the AI server, to generate an encryption key and a decryption key, step (406), transmitting: the encryption key and the first self-destruction code to the first computing device, through the first local network server and the decryption key and the second self-destruction code to the second computing device, through a second local network server; step (408), encrypting, at the first computing device, a data packet by using the received encryption key, to generate an encrypted data packet; step (410), receiving, at the first local network server, the encrypted data packet to perform a first security orchestration before transmission of the received encrypted data packet to the AI server; step (412), acquiring, at the AI server from the first local network server, the transmitted encrypted data packet (TEDP) and performing a second security orchestration before dispatching of the acquired TEDP to the second local network server; step (414), receiving, at the second local network server, from the AI server, the acquired TEDP to perform a third security orchestration before communicating the acquired TEDP to the second computing device; step (416), receiving, at the second computing device from the second local network server, the communicated acquired TEDP, the decryption key and the second self-destruction code; step (418), performing, at the second computing device, decryption of the received communicated acquired TEDP, using the received decryption key, to generate a decrypted data packet; and step (420), executing, the first self-destruction code and the second self-destruction code to destroy the encryption key and the decryption key.

Throughout the present disclosure, the term 'processing means' or 'microprocessor' or 'processor' or 'processors' includes, but is not limited to, a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The term "non-transitory storage device" or "storage" or "memory," as used herein relates to a random access memory, read only memory and variants thereof, in which a computer can store data or software for any duration.

Operations in accordance with a variety of aspects of the disclosure is described above would not have to be performed in the precise order described. Rather, various steps can be handled in reverse order or simultaneously or not at all.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

I claim:

1. A system to enable a secure communication between a first computing device and a second computing device, the system comprises:
   an artificial intelligence (AI) server is communicably coupled with a first local network server and a second local network server, wherein the AI server is configured to:
      receive a data communication request, from the first computing device;
      generate an encryption key and a decryption key, by utilizing an Elliptic Curve Cryptography (ECC) mechanism, in response to the received data communication request,
         wherein the encryption key is associated with a first self-destruction code and the decryption key is associated with a second self-destruction code; and
      transmit the generated encryption key and the first self-destruction code to the first computing device, through the first local network server, and the generated decryption key and the second self-destruction code to the second computing device, through the second local network server;
   the first computing device is arranged to receive the transmitted encryption key and the first self-destruction code, from the AI server, through the first local network server, and perform encryption of a data packet by using the received encryption key, to generate an encrypted data packet;
   the first local network server is arranged to receive the encrypted data packet and perform a first security orchestration before transmission of the received encrypted data packet to the AI server;
   the AI server is arranged to acquire the transmitted encrypted data packet (TEDP) from the first local network server and perform a second security orchestration before dispatching of the acquired TEDP to the second local network server;
   the second local network server is arranged to receive the acquired TEDP from the AI server and perform a third security orchestration before communicating the acquired TEDP to the second computing device;
   wherein first security orchestration, the second security orchestration and the third security orchestration comprises analysis of at least one parameter selected from: a traffic rate, a suspicious activity, a domain name server (DNS) details, a non-compatible data, and a type of attachment;
   the second computing device is arranged to:
      receive the communicated acquired TEDP the decryption key and the second self-destruction code from the second local network server;
      perform decryption of the received communicated acquired TEDP, using the received decryption key, to generate a decrypted data packet;
      execute the second self-destruction code to destroy the decryption key; and trigger an execution command to execute the first self-destruction code to destroy the encryption key.

2. The system of claim 1, wherein the first self-destruction code is associated with a first set of conditions to execute the first self-destruction code to destroy the encryption key.

3. The system of claim 1, wherein the first set of conditions is selected from a first nature of encryption algorithm used for encryption of the data packet, a first Internet Protocol (IP) address of the first computing device, a first Media Access Control (MAC) address of the first computing device, a first nature of the data packet, a first content of data packet, a first safe geological location of the first computing device, and an authenticity of the sender.

4. The system of claim 1, wherein the first computing device is configured to transmit an alert to the AI server, upon destruction of the encryption key.

5. The system of claim 1, wherein the second computing device is configured to transmit an alert to the AI server, upon destruction of the decryption key.

6. The system of claim 1, wherein the AI server generates a new encryption key, upon confirmation of destruction of the encryption key.

7. The system of claim 1, wherein the AI server generates a new decryption key, upon confirmation of destruction of the decryption key.

8. The system of claim 1, wherein the first computing device is configured to authenticate the sender using at least one biometric parameter, before transmission of the data communication request to the AI server, through the first local network server.

9. The system of claim 1, wherein the second computing device is configured to authenticate a recipient using at least one biometric parameter, before acquisition of data communication request to the AI server, through the first local network server.

10. The system of claim 1, wherein the second self-destruction code is associated with a second set of conditions to execute the first self-destruction code to destroy the encryption key.

11. The system of claim 10, wherein the second set of conditions is selected from a second nature of decryption algorithm used for decryption of the received communicated acquired TEDP, a second 36Internet Protocol (IP) address of the second computing device, a second Media Access Control (MAC) address of the second computing device, a second nature of the acquired TEDP, a second content of the acquired TEDP, a second safe geological location of the second computing device, and an authenticity of a recipient.

12. A method for enabling a secure communication between a first computing device and a second computing device, the method comprises:
receiving, at an artificial intelligence (AI) server, a data communication request, from the first computing device through a first local network server;
utilizing, an Elliptic Curve Cryptography (ECC) mechanism at the AI server, to generate an encryption key and a decryption key,
wherein the encryption key is associated with a first self-destruction code; and
wherein the decryption key is associated with a second self-destruction code;
transmitting:
the encryption key and the first self-destruction code to the first computing device, through the first local network server and the decryption key and the second self-destruction code to the second computing device, through a second local network server;
encrypting, at the first computing device, a data packet by using the received encryption key, to generate an encrypted data packet;
receiving, at the first local network server, the encrypted data packet to perform a first security orchestration before transmission of the received encrypted data packet to the AI server;
acquiring, at the AI server from the first local network server, the transmitted encrypted data packet (TEDP) and performing a second security orchestration before dispatching of the acquired TEDP to the second local network server;
receiving, at the second local network server, from the AI server, the acquired TEDP to perform a third security orchestration before communicating the acquired TEDP to the second computing device;
wherein first security orchestration, the second security orchestration and the third security orchestration comprises analysis of at least one parameter selected from: a traffic rate, a suspicious activity, a domain name server (DNS) details, a non-compatible data, and a type of attachment;
receiving, at the second computing device from the second local network server, the communicated acquired TEDP, the decryption key and the second self-destruction code;
performing, at the second computing device, decryption of the received communicated acquired TEDP, using the received decryption key, to generate a decrypted data packet; and
executing, at the second computing device, the first self-destruction code and the second self-destruction code to destroy the encryption key and the decryption key.

13. The method of claim 12, wherein the first self-destruction code is associated with a first set of conditions to execute the first self-destruction code to destroy the encryption key.

14. The method of claim 12, wherein the first set of conditions is selected from a first nature of encryption algorithm used for encryption of the data packet, a first Internet Protocol (IP) address of the first computing device, a first Media Access Control (MAC) address of the first computing device, a first nature of the data packet, a first content of data packet, a first safe geological location of the first computing device, and an authenticity of the sender.

15. The method of claim 12, wherein the first computing device is configured to transmit an alert to the AI server, upon destruction of the encryption key.

16. The method of claim 12, wherein the second computing device is configured to transmit an alert to the AI server, upon destruction of the decryption key.

17. The method of claim 12, wherein the AI server generates a new encryption key, upon confirmation of destruction of the encryption key.

18. The method of claim 12, wherein the AI server generates a new decryption key, upon confirmation of destruction the decryption key.

19. The method of claim 12, wherein the first computing device is configured to authenticate the sender using at least one biometric parameter, before transmission of the data communication request to the AI server, through the first local network server.

20. The method of claim 12, wherein the second self-destruction code is associated with a second set of conditions to execute the first self-destruction code to destroy the encryption key.

21. The method of claim 20, wherein the second set of conditions is selected from a second nature of decryption algorithm used for decryption of the received communicated acquired TEDP, a second Internet Protocol (IP) address of the second computing device, a second Media Access Control (MAC) address of the second computing device, a second nature of the acquired TEDP, a second content of the acquired TEDP, a second safe geological location of the second computing device, and an authenticity of recipient.

22. A non-transitory computer-readable storage medium, comprising executable instructions that, when executed by a processing system including a processor, facilitate performance of operations, comprising:
- receiving, at an artificial intelligence (AI) server, a data communication request, from the first computing device through a first local network server;
- utilizing, an Elliptic Curve Cryptography (ECC) mechanism at the AI server, to generate an encryption key and a decryption key,
    - wherein the encryption key is associated with a first self-destruction code and the decryption key is associated with a second self-destruction code;
- transmitting:
    - the encryption key and the first self-destruction code to the first computing device, through the first local network server and the decryption key and the second self-destruction code to the second computing device, through a second local network server;
- encrypting, at the first computing device, a data packet by using the received encryption key, to generate an encrypted data packet;
- receiving, at the first local network server, the encrypted data packet to perform a first security orchestration before transmission of the received encrypted data packet to the AI server;
- acquiring, at the AI server from the first local network server, the transmitted encrypted data packet (TEDP) and performing a second security orchestration before dispatching of the acquired TEDP to the second local network server;
- receiving, at the second local network server, from the AI server, the acquired TEDP to perform a third security orchestration before communicating the acquired TEDP to the second computing device;
- wherein first security orchestration, the second security orchestration and the third security orchestration comprises analysis of at least one parameter selected from: a traffic rate, a suspicious activity, a domain name server (DNS) details, a non-compatible data, and a type of attachment;
- receiving, at the second computing device from the second local network server, the communicated acquired TEDP, the decryption key and the second self-destruction code;
- performing, at the second computing device, decryption of the received communicated acquired TEDP, using the received decryption key, to generate a decrypted data packet; and
- executing, at the second computing device, the first self-destruction code and the second self-destruction code to destroy the encryption key and the decryption key.

* * * * *